United States Patent
Radatti et al.

(10) Patent No.: US 7,502,829 B2
(45) Date of Patent: Mar. 10, 2009

(54) APPARATUS, METHODS AND ARTICLES OF MANUFACTURE FOR INTERCEPTING, EXAMINING AND CONTROLLING CODE, DATA AND FILES AND THEIR TRANSFER

(75) Inventors: Peter V. Radatti, Conshohocken, PA (US); Richard J. Perry, Drexel Hill, PA (US)

(73) Assignee: CyberSoft, Inc., Conshohocken, PA (US)

( * ) Notice: Subject to any disclaimer, the term of this patent is extended or adjusted under 35 U.S.C. 154(b) by 799 days.

(21) Appl. No.: 10/831,985

(22) Filed: Apr. 26, 2004

(65) Prior Publication Data

US 2004/0199594 A1   Oct. 7, 2004

Related U.S. Application Data

(63) Continuation-in-part of application No. 09/886,169, filed on Jun. 21, 2001.

(51) Int. Cl.
*G06F 15/13* (2006.01)

(52) U.S. Cl. .............. 709/206; 709/202; 709/203; 709/205; 718/102; 707/201

(58) Field of Classification Search ............... 709/202, 709/203, 205, 206; 707/201; 718/102
See application file for complete search history.

(56) References Cited

U.S. PATENT DOCUMENTS

| 6,161,130 A | * | 12/2000 | Horvitz et al. | 709/206 |
| 6,266,692 B1 | * | 7/2001 | Greenstein | 709/206 |
| 6,330,590 B1 | * | 12/2001 | Cotten | 709/206 |
| 6,421,703 B1 | * | 7/2002 | Steinmetz et al. | 718/102 |
| 6,643,686 B1 | * | 11/2003 | Hall | 709/206 |
| 6,694,335 B1 | * | 2/2004 | Hopmann et al. | 707/201 |
| 2002/0116463 A1 | * | 8/2002 | Hart | 709/206 |

* cited by examiner

*Primary Examiner*—Jinsong Hu
(74) *Attorney, Agent, or Firm*—John F.A. Earley, III; Frank J. Bonini, Jr.; Harding, Earley, Follmer & Frailey (57) ABSTRACT

Apparatus, methods, and articles of manufacture are claimed for processing code comprising the preprocessing of code, transferring of the code from a storage area to a transfer component, decomposing the code, valuing the code, and comparing the code to a threshold value. The processing indicates the presence or absence of proscribed code, which may be spam, virii, confidential material, harassing material, etc. and so the code may be redirected. The especially preferred embodiments operate within a UNIX sendmail environment.

20 Claims, 3 Drawing Sheets

*Figure 1*

C { FROM: <johnsmith@johnsmith.com>
RCPT: <janedoe1@janedoe.com>

A {
Received: from a-11-222-333.AAA.zzzz.net (1.1.1.0) by mail1.xxxx1-yyyy.com (RS ver 1.0.87vs) with SMTP id 1-00000 for <janedoe1@janedoe.com>; Mon, 6 Oct 2003 13:47:02 -0400 (EDT)

content-class: urn:content-classes:message multipart/alternative;

Subject: RE: OOOO

MIME-Version: 1.0

Content-Type: text/plain; charset="us-ascii"

Content-Transfer-Encoding: quoted-printable

Date: Mon, 6 Oct 2003 12:50:17 -0500

Message-ID: < a-11-222-333.AAA.zzzz.net (1.1.1.0) >

X-MimeOLE: Produced By Microsoft Exchange V6.0.6249.0

X-MS-Has-Attach:

X-MS-TNEF-Correlator:

Thread-Topic: OO

Thread-Index: 222WWWW

From: "John Smith" <johnsmith@johnsmith.com>

To: <janedoe1@janedoe.com>

X-Loop-Detect:1

B {
This is a message designed to be spam. This is a message designed to be spam
This is a message designed to be spam. This is a message designed to be spam
This is a meesage designed to be spam. This is a message designed to be spam.

APPARATUS, METHODS AND ARTICLES OF MANUFACTURE FOR INTERCEPTING, EXAMINING AND CONTROLLING CODE, DATA AND FILES AND THEIR TRANSFER

CROSS-REFERENCE TO RELATED APPLICATIONS

This application is a continuation-in-part of co-pending U.S. Ser. No. 09/886,169, entitled "APPARATUS, METHODS AND ARTICLES OF MANUFACTURE FOR INTERCEPTING, EXAMINING AND CONTROLLING CODE, DATA AND FILES AND THEIR TRANSFER," filed on Jun. 21, 2001, by Mark G. Thomas and assigned to CyberSoft, Inc., which disclosure is incorporated herein by reference.

FIELD OF THE INVENTION

The present invention relates to apparatus, methods and articles of manufacture for intercepting, examining and controlling code, data and files and their transfer. More particularly, the present invention relates to apparatus, methods and articles of manufacture for intercepting, examining and controlling proscribed or predetermined code, data and files and their transfers.

BACKGROUND OF THE INVENTION

The rise of the Internet and networking technologies has resulted in the widespread transfer of code, data and files between computers. This material is not always what it seems to be. For example, code that is accessed on a remote machine and downloaded to a computer system can contain hostile algorithms that can potentially destroy code, crash the system, corrupt code or worse. Some of these hostile algorithms are viruses, worms, and Trojan horses.

Hostile, malicious and/or proscribed code, data and files ("code" as used hereinafter generally includes "data" and "files") can infect a single computer system or entire network and so posit a security risk to the computer system or network. (As is industry standard parlance, "code" also includes copies. For example, UNIX systems routinely makes copies of the code in the course of processing the code.)

The user and/or administrator (generally referred to hereinafter as "user") may wish to intercept, examine and/or control such code.

The user might also wish to intercept, examine and/or control other code as well, for example, code which the user does not know to be hostile, but wishes to intercept nonetheless, for example, potentially sexually or racially harassing email, junk email (also known as "spam"), trade secret text, or other confidential information, etc. This latter type of code is known hereinafter as "predetermined code."

Antivirus or other similar packages attempt to protect the system or network from hostile, malicious, predetermined and/or proscribed code (generally referred to hereinafter as "proscribed code.") VFIND®, from CyberSoft, Inc., is one such product that may protect systems and networks from proscribed code. If the virus programs are not run frequently—an all too common occurrence—they will not protect the system. Therefore, the benefits and protections offered by antivirus programs are often lost.

Moreover, antivirus and similar programs often require frequent updating as they rely on a database of proscribed code. As new proscribed code is identified, the database must be updated. However, database updates may be delayed or simply not done and so the effectiveness of the program may wane with time.

Moreover, code is constantly mutating. That is, a hostile individual may release modified code, or a regular basis, in order to avoid detection by an antivirus or similar program.

Accordingly, it would be beneficial to have apparatus, methods and articles of manufacture to simply and effectively intercept, control, and/or examine incoming and outgoing code in an efficient and effective manner transparently or almost transparently to the end-user, with little or no operational effort required by the user.

It would also be beneficial to have methods of code analysis that attempt to intercept, control, and/or examine incoming and outgoing code.

SUMMARY OF THE INVENTION

The present invention comprises apparatus, methods and articles of manufacture to simply and effectively intercept, control, and/or examine incoming and outgoing code in an efficient and effective manner transparently or almost transparently to the end-user, with little or no operational effort required by the user.

Various embodiments, may process, which includes intercepting, examining, and/or controlling, any or all code in a computer or network. Intercepting, examining and/or controlling code includes but is not limited to sorting, altering, monitoring, blocking, logging, quarantining, discarding, redirecting and/or transferring code. The preferred embodiments are used in Unix® and Unix®-like platforms, including but not limited to Linux® and its variants, as well as other operating system platforms including but not limited to Microsoft Windows® XP, NT, 2000, 95, 98 and ME, IBM MVS, IBM OS/390, SNA, 3270 RJE, MacOS, VxWorks® and others.

DETAILED DESCRIPTION OF THE PREFERRED EMBODIMENTS

The present invention comprises apparatus, methods and articles of manufacture for intercepting, examining, and controlling code. The preferred embodiments, which may operate on a single computer system or multiple systems depending on the operating system and other variables process, that is, intercept, examine, and/or control any or all code transferred through any number of storage devices and/or connections in a computer or network, e.g., email, instant messaging, peer to peer, other network transfers, etc. Intercepting, examining and/or controlling code includes but is not limited to monitoring, blocking, logging, quarantining, discarding or transferring code.

The preferred embodiments implement proscribed code scanning. The code may be transferred through any number of connections in a computer system, systems, network or networks. Processing code, as used herein, includes intercepting, examining and/or controlling code, and also includes but is not limited to sorting, altering, monitoring, blocking, logging, quarantining, discarding, redirecting and/or transferring email, instant messaging, peer to peer, other network transfers, etc.

Although various embodiments may be used to scan code in various ways, the especially preferred embodiments are used in a Unix® environment. Especially preferred embodiment are used on a Unix® platform such as System V, Sun Solaris®, IBM AIX®, HP-UX®, etc. The following description of the preferred embodiments uses Sun Solaris® operating system Unix® terminology. However, it should be specifically understood that embodiments can be implemented in other Unix® and Unix®-like platforms, including but not limited to Linux® and its variants, as well as other operating system platforms including but not limited to Microsoft Windows® XP, NT, 2000, 95, 98 and ME, IBM MVS, IBM OS/390, SNA, 3270 RJE, MacOS, VxWorks® and others. Moreover, embodiments may be used in distributed computing or cross platform situations, such as for example, in a network using various protocols or mechanisms to transfer code, e.g., SMTP to transfer messages, in an enterprise running IBM's MQSeries of products which provides, inter alia, enterprise-wide messaging capabilities using store and forward technology, etc.

The preferred embodiments are written in Unix® Bourne shell script, with components written in other languages, although any language known in the art may be used. In the preferred email Unix® embodiments, a customized version of sendmail is provided as is described further below. Although various embodiments may be used to scan code entering a system in various ways, e.g., email, instant messaging, peer-to-peer, file transfer, other network transfers, etc., the especially preferred embodiments are used in a Unix® environment.

The especially preferred embodiments process stored and forwarded code such as that in a UNIX sendmail environment. "Stored and forwarded code" is defined herein as discrete units of code, stored and forwarded as those discrete units. Stored and forwarded code may be processed through any number of connections in a computer system, systems, network or networks.

Figure 1:
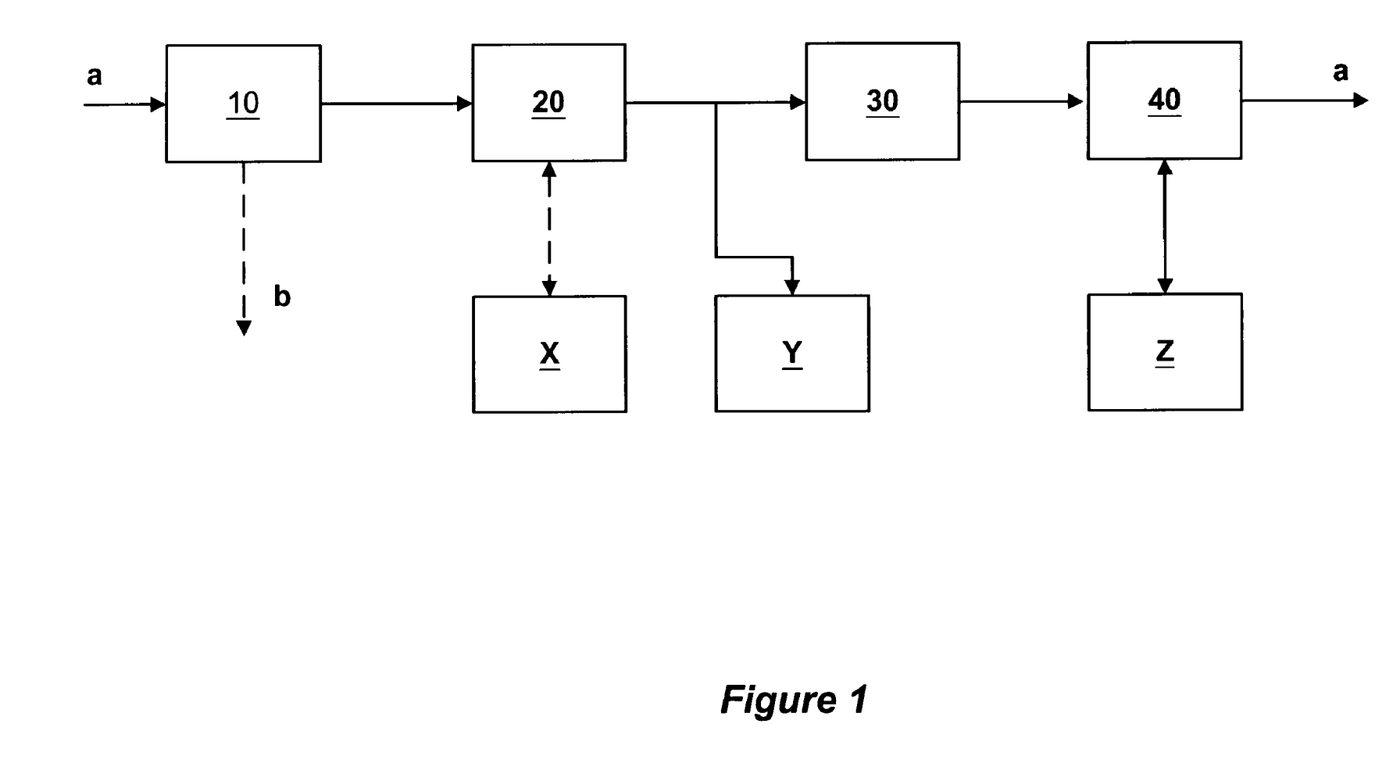
FIG. 1 is a schematic diagram of a preferred embodiment.

FIG. 1 shows a preferred embodiment with Preprocessing Component 10, Code Decomposer Component 20, Evaluation Component 30, and Comparison Component 40. Present also are Feature Components X, Y and Z. These are optional feature components, which may be present and/or process code or not, as desired, and as further described below. There may be fewer, more and/or other optional features components as desired, as well as features, processes and components along the processing path.

As the code travels through the embodiment of FIG. 1, in the direction shown by a, code may be optionally temporarily or permanently redirected to another path, as is shown by the direction b. Redirection is used here to mean transmission of the code to a path other than a code address. This may be for storage purposes, further analysis, etc.

The optional feature components provide further analysis as desired. For example, a decryption feature component, such as might be implemented at X, provides analysis of altered code: code to be examined may be altered, (defined herein as altered by encryption or a communication protocol after being generated by an application or program for transmission to a complementary encryption or communication protocol) in whole or part. In order to process the altered code, the decryption feature component is used in a "man in the middle" implementation.

In the especially preferred embodiments, the man in the middle implementation takes place in a STREAMS enabled Sun Solaris Unix platform. When a process or other application (e.g., a Web browser) opens a STREAMS device, a STREAMS module tpicept will be inserted in the stream, and intercepts code passing in the stream.

If a process or other application opens an encrypted connection, for example an HTTPS connection, tpicept will detect the opening and run appropriate server and client modules, such as a SSL protocol server module and SSL protocol client module in an HTTPS connection.

Once the appropriate server and client are run, all communications through the stream will pass through those connections.

This results in the appropriate server module unaltering the code. The code is then returned to the main process path (e.g., path a as shown in FIG. 1.)

Another optional feature component provides a code alteration component, as it may be desired to alter the code as well. For example, encryption hashing might be desirably used on the code, e.g., to provide blind and/or archival email with a provable date and time, in a similar manner to registered ground mail.

For example, in especially preferred embodiments, the code, and/or parts of the code (such as body, headers, attachment, envelope of an email message) might be hashed using methods as known in the art. That hashing could include a date and time stamp as part of any hash value. The hash values could then be provided for searching or other subsequent use: for example, as proof that the code moved through that system on that day and time; published, as on website with the date and time as initial proof, as archival evidence of the code, etc.

Optional feature components may also provide for non-code actions to be executed as a result of the processing of the code. ("Non-code actions" is used here to mean actions that are other than those that are intended to occur as a result of receipt of the code. For example, preventing a worm or other malicious code from running would be a non code action. More specifically, a worm such as Klez, uses the system's address book to mail itself to other systems. Klez would be prevented from running, thus executing a non code action.)

Additionally, notifications to the user, sysadmin, etc. will be sent. It should be noted that notifications themselves could be spam—when too many notifications are sent, that number of notifications could itself become overwhelming. Therefore, a throttle down component is available, so that one, two or no notifications are sent, or notifications of volume are logged.

As another example of optional feature components, initial review of code might provide modified processing paths as well, in various preferred embodiments. For example, process security features or other predetermined parameters might be altered by code contained appropriate indictors. For example, by identifying the sender of a message, through envelopes and/or headers, system access levels might be modified for the code, such as when an employee, with a trusted email address, sends an executable file to a recipient. Although the recipient's processor is configured to block executable files by default, the receipt and execution of an executable from a trusted sender is allowed. (The determination of trusted sender can be done through methods as are known in the art, e.g., digital signatures, PKI/PKE, etc.)

As yet another example of optional feature components, initial review of code might provide user notification as well, in various preferred embodiments. For example, the use of header or other information might provide notification to the user (which is a term that may include either or both an individual as well as an system) of the sender's (which is a term that may include either or both an individual as well as an system) address. The user will then be offered the option to redirect the message, process the message, review the message immediately, etc.

As yet another example of optional feature components, features may include redirection to another system, as well. For example, "honey pot" or "tar pit" type features may be implemented as desired in order to redirect code to another system, e.g., in order to collect samples, further analyze code, archive code, etc. An example of a tar pit feature might be the redirection of emails from a malicious user to the tar pit. The code present in the emails, which is now caught in the tar pit, could then be analyzed when desired. (The code may be hashed as well and checked against a database to ensure that duplicates are not sent—otherwise the tar pit might become flooded with bulk malicious code.)

As another embodiment, code that has been identified post comparison (as described further below) might be redirected to a honey pot.

Configuration examples might also include automatic redirection of certain types of code. For example, .exe code may be presumed, as a default setting, to be high risk. Thus, .exe code would be automatically directed to a tar pit.

Any feature component is not limited to code. Data about the code, such as processing statistics (e.g., number of e-mails processed, number of spams blocked, etc.) might also be gathered. This data might be used in various ways, such as transmitted to another system, retained for storage, etc.

An example of this type of feature would be email hashing upon receipt. Various uses could be made of the hashed email. For example, hashes could be compared and if a number of duplicate hashes are received within a time period, (meaning that a number of duplicate emails have been received) then only one email of the duplicate hashed type would be allowed through the system. Thus, bulk emails would be prevented from overwhelming the system.

These various features may be implemented in any order desired. For example, hashing and duplicate excision may be implemented before tar pit collection, so that only one representative sample is collected. A feature set may be made available and provide the user with the ability to choose what features and in what order the user desires.

This optional feature component, as with other features, feature components, processes and components described herein, may be modified as desired. That is, the process may be configured to include or not include features, feature components, processes and components when desired.

Additionally, features, feature components, processes and components may be interposed in the system along the code path as desired. The use of the designators X, Y and Z in FIG. 1 are examples only, to illustrate where features, feature components, processes and components may be utilized in an input/output environment.

Preprocessing Component 10 provides an initial scan of the code. Predetermined parameters are used in the scan to determine actions to be taken upon the code, such as continued transmission of the code along path a, redirection of the code along path b or another path, etc. In the especially preferred embodiments, Preprocessing Component 10 scans emails according to sender information. For example, and briefly turning to FIG. 2, a typical email message is typically comprised of header A, body B and an envelope C. (The Figure is meant to be illustrative only—the actual content as shown in the Figure does not represent operational components.)

Figure 2:
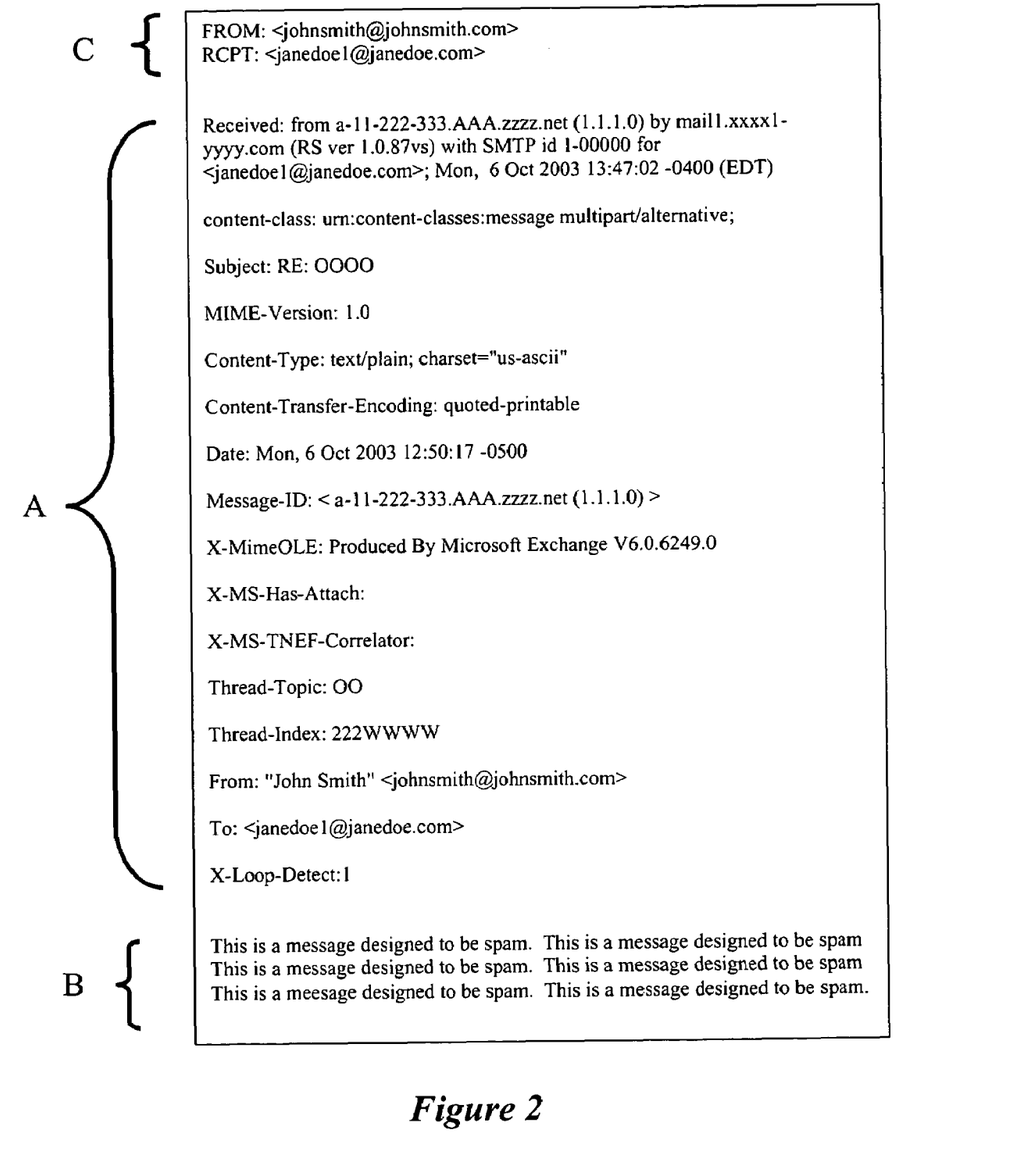
FIG. 2 is an illustrative email message.

Each of these components may be scanned for proscribed code, as is further described below. If sub headers exist, as with an attachment, the sub headers, usually comprised of encoding method and file names, can be scanned as well. For example, an attachment with a file name ending in .exe would likely be flagged.

Each of these components may be scanned individually, so that for example, multiple scans may occur in a single scanning operation on multiple components of an email. Thus, an email may be deconstructed and some, none or all pass through a scanning operation.

As was noted above, the sendmail preferred embodiments scan the header and/or envelope components of a email header component, shown at C in FIG. 2. With those embodiments, sendmail may be configured to block messages from certain senders by comparing a hashed element against a database (not shown) of email senders that should be blocked.

So, for example, a scan of the sender of an email message may begin with the conversion of both the sender's email address and the recipient's email address into canonical form, if necessary. Both canonical addresses are then concatenated, with an appropriate separator. A hash (preferably md5) is created of the combined address information. That hash is checked against predetermined address hashes. If the match is true, the message will be blocked. This is shown by the following example:

user janedoe@janedoe.com desires to block all messages from johnsmith@johnsmith.com. She inputs the sender address to block into an administrative control panel. (The canonical step is not shown here.) That control panel concatenates the sender address to her address (e.g. "johnsmith@johnsmith.com/janedoe1@janedoe.com") and produces an md5 hash of the result. The resultant hash is stored in a blocked address database.

When any subsequent message is received, that message's sender information is extracted, concatenated with the receiver's address information, hashed, and the resultant hash checked against the blocked address database. If present, various actions may be taken. For example, the message may be blocked, the administrator or user alerted, etc.

The blocked address database may be created and/or modified by the user, as well as being created and/or modified by a system or other administrator. For example, a prepopulated database of known spam senders may be created and/or modified by an administrator, and so be made available to the system for further user operation.

Other embodiments might perform partial as well as full scans of sender information. So, for example, a character type string analysis might exclude those senders matching its characters (e.g., excluding "sex.com" as a character string.) Other embodiments may also scan other header information instead of, or in addition to, sender information. For example, the path a message has taken to a recipient may be shown wholly or partially in its envelope and/or its header (see, e.g., C and B respectively of FIG. 2.) Yet that information may be scanned and various actions taken if desired. This type of scanning might be desired in various circumstances, such as where a known path, router etc. is known to be a spam passthrough and thus would desirously be blocked.

It should be noted that envelope and/or header information may be only one of many message components scanned. For example, a body and/or attachment may be scanned as well, such as for known text, or other code, such as file names, extensions, etc. For example, junk mail message texts may be copied, used and reused by various senders. Thus, it may be desired to hash the entire text of various messages and compare those hashes to a database of known junk mail messages in order to eliminate junk mail.

It may also be desired to scan subcomponents of the message, for example, to scan the subject line component, or other components, of the header component. This may be done using a technique similar to that set forth above. So, for example, a subject line of a message to be scanned may be extracted, hashed and the hash compared against a subject line database.

Returning to FIG. 1, Code Decomposer Component 20 receives incoming code along path a. Path a may be configured in any desired manner, e.g., to intercept code along an internal system communications channel; to intercept code in an external network; as through a server; through a UNIX pipe; etc.

As it receives any incoming code, Code Decomposer Component 20 identifies the nature of the code and decomposes the code. The Code Decomposer Component 20 used in the especially preferred embodiments is UAD (Universal Atomic Disintegrator) available from CyberSoft, Inc. If the code to be decomposed is divided by segment, (e.g., email, which usually contains a header and a body) each segment is decomposed while maintaining the segment integrity. So, for example, in an email message containing header and footer segments, each would be decomposed and maintained as separate segments.

The nature of the decomposition is, in the preferred embodiments, into the lowest possible state. For example, if the code comprises a compressed file, it will be decomposed into the lowest possible state, e.g., the original uncompressed form. It should be noted that if code is presented in a format that is not decomposable, or if only parts of the code are decomposable, the code may be flagged as such in the preferred embodiments and various actions such quarantining, deleting, logging, etc. may be taken as desired. It should also be noted that if the code is already present in its lowest possible state, i.e. before it passes into said Code Decomposer Component, then the code will pass through said Code Decomposer Component without further decomposition.

It is usually desirable to determine code type before decomposition in order to assist in decomposition. In some embodiments therefore, a Code Identification Component may be used. In the preferred embodiments, identification of code type is done prior to decomposition by an identification subcomponent of Code Decomposer Component 20, which reads the beginning of the code and makes a determination of the type based on that reading.

In various embodiments, Code Decomposer Component 20 may have various features providing code processing. For example, code conversion features may be present providing for recognition of types of code and processing that code in a specific way as a result of that recognition. For example, recognizing text or formatted text, (e.g., instant messaging, email, word .doc, HTML, .pdf, XML, zip file, etc.) and the use of a conversion function (e.g., HTML to text.) Other examples may include converting one type of code to another, for example converting images to text, including extracting images from text, voice mail to text by way of a voice recognition program.)

Additionally, in yet other embodiments identification and/or decomposition may be bypassed or eliminated, as is further described below. For example, if the code stream is of a known type, a Code Decomposer Component 20 may not be used, or if one is used it may be bypassed. This example might be used in order to accelerate operation, reduce use of system resources, etc.

Returning to FIG. 1, the code passes to Valuation Component 30. Preferably, if output from Code Decomposer Component 20 is passed, that output is in the form, for code, of code name, code type and code data.

Valuation Component 30 provides various values for the code, according to various parameters, which may be set as desired, e.g. through user preferences, default settings, etc.

In especially preferred embodiments, Valuation Component 30 comprises tokenization, hashing, and numerical value components. (Of course, in other embodiments, these components may be separately present, in one or more other components than Valuation Component 30. Additionally, one or more of these components may be present, absent, used or unused as desired.) Valuation Component 30 may also be bypassed entirely. For example, Valuation Component 30 may be set so that code passes through without any operation on the code by Valuation Component 30.

For example, in the especially preferred embodiment, Valuation Component 30 first tokenizes the code, which involves translating characters within the code into discrete groups, known as tokens.

The tokenization component in Valuation Component 30, in the especially preferred Unix embodiments, uses strtok( ) to tokenize the code according to automatically and/or manually set delimiters. For example, the presence of white spaces in email is used as a delimiter in preferred embodiments, e.g., a code string such as "Free Money" would be tokenized into two strings "Free" and "Money."

Any desired delimiters may be used. In a preferred embodiment, for example, punctuation or other non-letter characters are used as delimiters, e.g., "/" or "0" may be used as delimiters, thus, for example, "Free/Money" or "Free( )Money" would be tokenized into two strings "Free" and "Money". Tokens may vary in length.

In the especially preferred embodiments, the delimiters used are shown at Table I.

TABLE I

| \t (tab) | \r (carriage return) | \n (line feed) | \f (form feed) | \v (vertical tab) | \ |
|---|---|---|---|---|---|
| " | ( | ) | * | + | , |
| / | : | ; | < | = | > |
| ? | @ | [ | ~ | ] | ^ |
| ` | { | \| | } | [blank or white space] | |

The list of delimiters is exclusionary, which means that any character not identified as a delimiter is included within a token.

EXAMPLE 1

Using the above table,
"Free beer's! only $0.50 from JOE'S" "BEER" would be broken into tokens as: "Free", "beer's!", "only", "$0.50", "from", "JOE'S" "BEER".

In the especially preferred embodiments, tokens may be a single group of characters as well as multiple groups of characters. So, for example, the message: "I have free beer" (assuming the token delimiter is a space) results in ten separate tokens as shown in Table II:

TABLE II

| Token | Number |
|---|---|
| "I" | 1 |
| "have" | 2 |
| "free" | 3 |
| "beer" | 4 |
| "I have" | 5 |
| "have free" | 6 |
| "free beer" | 7 |
| "I have free" | 8 |
| "have free beer" | 9 |
| "I have free beer" | 10 |

In the especially preferred embodiments the hashing component of Valuation Component 30 then hashes the code to produce a 32-bit values using the FNV-1a hash function from http://www.isthe.com/chongo/tech/comp/fnv/. The first token is hashed, producing a 32 bit or 4 byte value. If the code only has one token, then the value of that token is the resultant hash. If the code has more than one token, the 32 bit value is continued by hashing the second token, and then continued for subsequent tokens, until a final 32 bit hash value is reached.

In other embodiments, other hash methods may be used. For example, a 30 bit hash value may be generated for tokens. Also, in certain embodiments, additional information may be appended as well to the hash value. For example, other identification information, status information, etc. as desired. One especially preferred embodiment, described in further detail below, prepends group information to a 32 bit hash value, making a 34 bit string.

Each hash value obtained from each token, as explained above, may then be numerically valued according to a numerical evaluation component, such as described in further detail below. However, further hash processing is used in especially preferred embodiments.

Further hash processing in the especially preferred embodiments involves assigning tokens to group levels. A group level is calculated by counting the number of tokens in the group minus 1. Four tokens (equal to Level 3) constitutes the largest number of tokens considered in especially preferred embodiments. A greater or lesser number could be selected in other embodiments. So, for example, with four group levels, the assignment of the tokens of Table 2 above to groups is shown in Table 3:

TABLE III

| Token | Group Level |
|---|---|
| "I" | Level 0 |
| "have" | Level 0 |
| "free" | Level 0 |
| "beer" | Level 0 |
| "I have" | Level 1 |
| "have free" | level 1 |
| "free beer" | level 1 |
| "I have free" | level 2 |
| "have free beer" | level 2 |
| "I have free beer" | level 3 |

Once a group level is assigned a token, the group level is then appended or prepended to the hash value of the token. In one especially preferred method, the group level is translated into binary, and it is prepended to the front of the hash value for the token, so the final string is a 34 bit word. In other embodiments, a 30 bit hash value may be used for any particular token, and a two bit group level then appended or prepended to that 30 bit hash, making a 32 bit string.

The numerical valuation component of Valuation Component 30 numerically values the hashes, once the desired level of hash values is established. It should be noted that the hash values may be used for code identification without numerical evaluation. For example, a hash value may be compared against stored hash values, e.g., a database of hashed values and the results utilized to provide code processing. For example, a hash value for code may be compared to a database of known proscribed code. If the hash value is present, the code may be redirected.

Any use of hash values may also involve processing those values. For example, an especially preferred embodiment processes hash values by constructing a code specific binary table of hash values. That code specific binary table is obtained by first sorting the hash values into a code specific binary tree by hash and hash count. (Hash count is the number of times that particular hash appears within the scanned code.) The code specific binary tree is then written in ascending sorted order, according to hash value, into a binary file, which is then available for further use.

Other embodiments may use other processing methods for the hash values. Hash values do not necessarily have to undergo processing and/or code identification. For example, numerical valuation could follow after obtaining hash values, with or without processing and/or code identification of those values.

The especially preferred embodiments utilize a sorting method for hash values prior to numerical evaluation. Each code specific binary table is then compared to one or more proscribed code indicators to provide a numerical valuation for the code. In the preferred embodiments, the proscribed code indicators may be one or more databases. Other indicators, such as lists, tables, arrays, markers, etc. may also be used.

The numerical valuation process in the especially preferred embodiments uses two databases: 1) a proscribed code database ("pcd"); and, 2) a non proscribed code database ("npcd"). These databases may have been constructed using a variety of methods, as will be further described below.

In the especially preferred embodiments, each database contains a number of hash values sorted similarly to the code hash values. So, for example, if a code specific binary table is used, the databases will be sorted so as to minimize retrieval time for that code specific binary table sorting scheme.

Numerical valuation, in the preferred embodiments, takes place according to the following algorithm.

The numerical valuation is set to be a function of probability of any particular hash value being proscribed code. The probability of any particular code being proscribed code is in turn a function of the presence of the hash value in the proscribed code indicator. For each token $i=1 \ldots n$, the probabilities $P(t_i|\text{class}=pcd)$ represented by the value $b_i$ and $P(t_i|\text{class}=npcd)$ represented by the value $g_i$ are calculated according to the following formulas:

$$b_i = \min(1, \text{count}(t_i, \text{class}=pc)/\text{count}(\text{class}=pc))$$

$$g_i = \min(1, \text{count}(t_i, \text{class}=npc)/\text{count}(\text{class}=npc))$$

pc=proscribed code
npc=non proscribed code
count(class=pc) is the number of pc codes in pcd
count($t_i$, class=pc) is the number of occurrences of $t_i$ in pcd
The count ratios can turn out larger than 1, so are limited to 1, using min.

A ratio $r_i$ is then computed:

$$r_i = 1/2, \text{ if } b_i == g_i$$
$$= b_i/(b_i + g_i), \text{ if } b_i \mathbin{!=} g_i$$

and values $p_i$ and $q_i$ defined:

$$p_i = \max(0.01, \min(0.99, r_i))$$

$$q_i = 1 - p_i$$

resulting in a final ratio Ppc for $t_i$ being pc as:

$$\frac{P(t_i \mid \text{class} = pc)}{P(t_i \mid \text{class} = npc)} = \frac{p_i}{q_i} = Ppc$$

Ppc equates to an evaluation of the code. However, other evaluations may be used. For example, $p_i$ may be used as an evaluation, $q_i$ may be used, etc. Evaluations may be combined with each other as well, so that more than one is used, derivations are used, etc.

It should be noted that other methods of numerical valuation may be used as well. For example, hashing may be to the code or components of the code and numerical valuation of those hashes made. These alternative embodiments may be following tokenization, without tokenization, etc.

For example the number of identical hashes for the code may be provided. This number may be obtained locally, over a number of systems, through a network, etc. Time period analysis may be used as well in the valuation. For example, the number of identical hashes may be obtained for a predetermined time period, locally and/or over a number of systems.

Once the number is obtained, then it is compared to a predetermined threshold, which is, in the preferred embodiments done using Comparison Component 40. Redirection or other treatment may be then as desired.

So, for example, assuming code with hash value 3344 was received, during a two hour time period, one thousand times on the local system and one million times at the local router. A comparison to threshold reveals that such a number indicates proscribed code. All such code with that number are then redirected to a storage facility for later analysis.

It should be noted that in certain preferred embodiments, certain hash codes may be eliminated from threshold evaluation, for example, those resulting from messages that have already been analyzed, are preapproved, etc.

As noted herein, if code is indicated as proscribed, or otherwise redirected, further action using that indication may be taken. For example, if a code is proscribed code then a hash value of code could be stored. Incoming code and/or its components could then be compared to the stored hashes. If a match is made to the incoming code and/or its components, then the incoming code could be treated as was the compared code, (e.g. if the hashed code was spam, the incoming code would also be marked as spam) redirected, etc.

Returning now to the embodiment of FIG. 1, Comparison Component 40 may be used to classify any particular token as pc by comparing it to a threshold value Tpc. Tpc is set somewhere between 0 and 1, excluding 0 and 1. So, for example, a threshold of 0.5 may be set in an embodiment. Then any token with a Ppc equal to or in excess of 0.5 would be identified as proscribed code and identified as such for further processing. Any token with a Ppc less than 0.5 would be identified as clean code and identified as such for further processing. The threshold may be modified during use as desired.

The especially preferred embodiments use VFIND®, a pattern detector from CyberSoft, Inc. as Comparison Component 40. Ppc is first printed to a text buffer and appended as a component of the code being scanned. The code with appended Ppc is then sent to VFIND or other pattern detector, where the Ppc is read and compared to Tpc. If Tpc is exceeded by Ppc, then various actions, including redirection, may be taken. For example the code may be placed in a buffer and a system administrator alerted, the code deleted and user notified, etc.

It should be noted that, by using a pattern or similar scanner as, or in addition to, Comparison Component 40, code may be scanned for other patterns as desired. For example, a virus scanner may be used to scan the code for viruses. Other scans for other patterns may take place as well.

There may be more than one hash value in any particular code being scanned because the code may have consisted of more than one token. The calculation of these multiple hash value codes involves the following algorithm:

The probability of particular code being proscribed code (pc) is set using the equation:

$$P(cde \mid \text{class} = pc) = P(t_1, t_2, \ldots, t_n \mid \text{class} = pc)$$

When the assumption that each hash value is evaluated independently is made an approximation may be obtained of the above equation. That approximation is:

$$P(cde \mid \text{class} = pc) \sim = P(t_1 \mid \text{class} = pc)\, P(t_2 \mid \text{class} = pc) \ldots P(t_n \mid \text{class} = pc)$$

As the hash values are not wholly independent—they came from the same code—a compensatory technique, as further described above, was used to obtain relations between words. That compensatory technique was to use consecutive tokens, in their various groups, to obtain the hash value tokens.

The probability of particular code being non proscribed code (npc) is also set using the equation:

$$P(cde \mid \text{class} = npc) \sim = P(t1 \mid \text{class} = npc)\, P(t2 \mid \text{class} = npc) \ldots P(tn \mid \text{class} = npc)$$

The ratio $P/(1-P)$ is obtained by:

$$\frac{P}{1-P} = \frac{P(t_1 \mid \text{class} = pc) \ldots P(t_n \mid \text{class} = pc)\, P(\text{class} = pc)}{P(t_1 \mid \text{class} = npc) \ldots P(t_n \mid \text{class} = npc)\, P(\text{class} = npc)}$$

which results in Ppccode. Ppccode may then be compared to a threshold value Tpc in a similar manner to that as described above.

As Ppccode may result in an underflow to 0 and overflow to 1, a log ratio is used:

$$\begin{aligned}X &= \log(P/(1-P)) \\ &= \log(p_1) - \log(q_1) + \ldots + \log(p_n) - \log(q_n) + \\ &\quad \log(P(\text{class} = pc)) - \log(P(\text{class} = npc))\end{aligned}$$

The log probability can be computed as:

$$P_{log} = 1/(1+e^{-x})$$

which may be compared to a threshold value Tpc in a similar manner to that described above.

In the especially preferred embodiments, $P_{log}$ may be used in a exponential function to obtain a spam probability, P, which may be compared to a threshold value Tpc in a similar manner to that described above.

As was described above, one or more proscribed code indicators is used in the comparison, and in the preferred embodiments, the proscribed code indicators may be one or more databases. The comparison process in the especially preferred embodiments uses two databases: 1) a proscribed code database ("pcd"); and, 2) a non proscribed code database ("npcd"). In other embodiments, other indictors besides proscribed code indicators may be used as well, and databases created for those indicators, comparisons done, etc.

The proscribed code indicators may be constructed automatically or manually or through a combination of techniques. For example, in the especially preferred embodiments, using pcd and npcd, the databases are initially populated using manual techniques, that is, code is processed and proscribed code identified manually. The databases are then further populated through automatic means as will now be described. In certain especially preferred embodiments, the databases are populated in whole or part using data generated from a pattern scanner such as VFIND from CyberSoft, Inc.

Assuming a hash record is generated, such as was described above with regard to the code specific binary table of hash values used in the especially preferred embodiments, the hashes generated from the code are sorted into one of two directories depending upon their resolution (i.e. whether the code was proscribed or non proscribed.) Thus, the embodiment contains a loopback mechanism, which updates the databases.

If more than one code strings are being processed, so that a series of hashes are generated, the hashes may be stored as desired in the databases, e.g., at regular or irregular intervals, etc.

In the preferred embodiments, the combined spam and clean hash databases contain only hashes which occurred at least twice, to keep the size of the databases reasonable.

In the especially preferred embodiments, the process of database storage occurs through a number of steps, occurring daily, or at other intervals as desired:

Npc hashes generated in the previous day are merged into a daily npcd. Any particular code specific binary table of hash values may then be removed, retained for further analysis, etc.

Fourteen days of daily npcd are retained at any one time. Thus, when a new npc daily hash is generated, the oldest npc daily hash (14+1) is deleted. The daily npc hashes are merged into one master npc. In other embodiments, other periods of code scanning may be used to generate hash files as desired.

Hashes may be added selectively. For example, any hashes which only occurred less than twice overall, in the pc and npc databases, may be eliminated before being added to the daily npc.

Pc code hashes are held in the especially preferred embodiments through one period, which permits further manual or automated review of the code identified as pc by a system administrator. In that review for example, if email messages are being scanned for proscribed code, certain messages may have been classified as pc inaccurately. By further reviewing the code classified as pc, any such inaccurate classifications may be repaired, and the code released.

Pc hashes generated in the previous day are merged into a daily npcd. Any particular code specific binary table of hash values may then be removed, retained for further analysis, etc.

Fourteen days of daily pcd are retained at any one time. Thus, when a new pc daily hash is generated, the oldest pc daily hash (14+1) is deleted. The daily pc hashes are merged into one master pc. In other embodiments, other periods of code scanning may be used to generate hash files as desired. It may be desired to keep the code input somewhat equal during those periods.

The period of time or other intervals used to generate daily pc and npc may be varied as desired. The number of daily pc and npc may be varied as well, as may be the number used to construct the pc or npc. For example, a lesser period than 14 days would, in relative terms, decrease the size of the master hash files and provide faster adaptation, and a greater period would, in relative terms, increase the size of the master hash files and provide slower adaptation but most likely increase accuracy, as it would have more past data included. A threshold lower or upper value for amount of stored code may also be used, in order to ensure the databases are operational.

The use of the most recent material creates a sliding window, which provides an "adaptive" training of the pc and npc databases. Thus, if the code changes over intervals the differences are included in the subsequent database matching.

Figure 3:
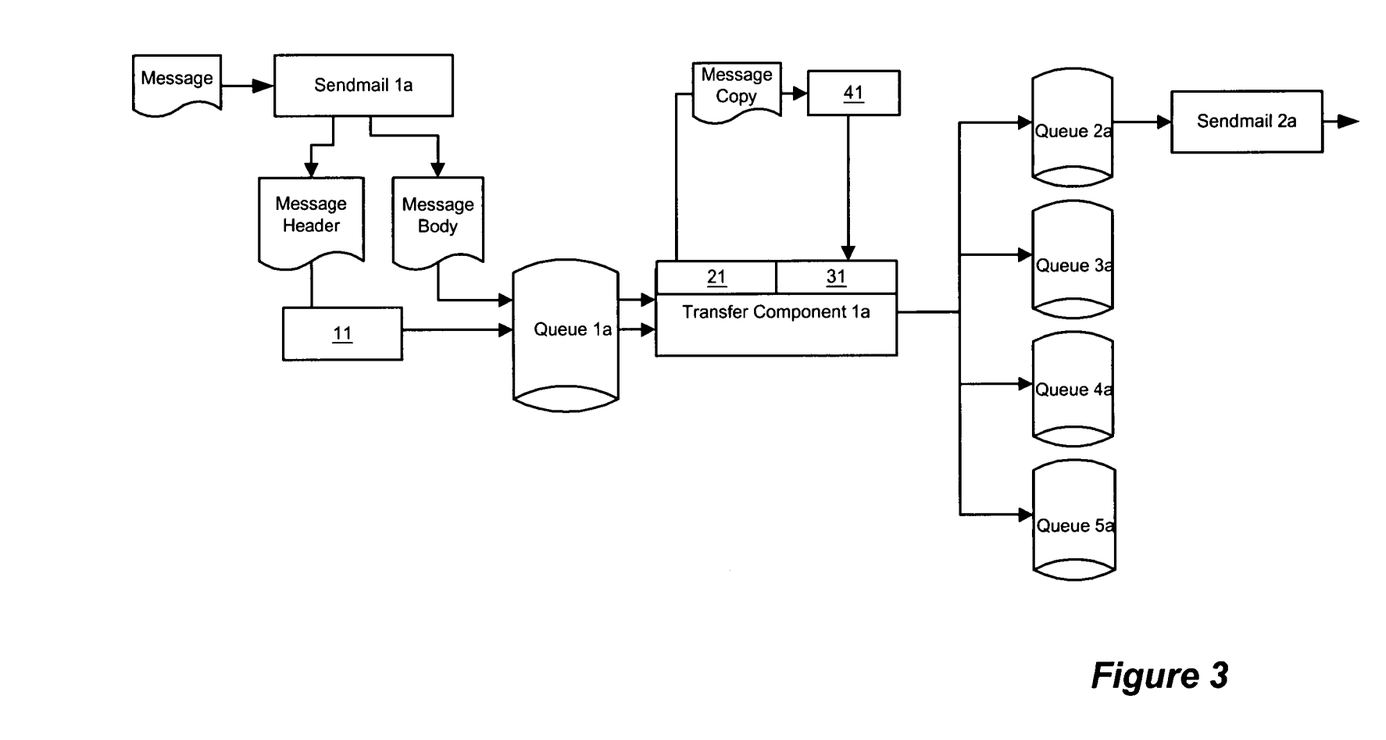
FIG. 3 is a schematic diagram of a preferred embodiment.

For example, an embodiment for email blocking may operate using sendmail, in whole or part. Turning now to FIG. 3, a schematic diagram of a sendmail preferred embodiment is shown. In this embodiment, a single machine is serving as the mail hub. Preprocessing Component 11, similar to that shown in FIG. 1, is shown, as are Code Decomposer Component 21, Categorization Component 31, and Comparison Component 41. Also shown is a transfer component and four secondary storage components, or queue directories.

It is important to note that the number of secondary storage components or queue directories used in any particular embodiment is as desired: for example an embodiment might comprise one secondary queue directory. It might usually be advantageous to use a secondary queue for secondary storage components that is the same type as a first storage component, for example, in a sendmail embodiment it would usually be advantageous to construct a secondary sendmail queue because a sendmail delivery process could be fairly easily configured to pick up mail from that secondary queue. However, it should be noted that embodiments may use any type or number of secondary storage components, or dispense with a secondary stored component entirely. For example, preferred embodiments might use some type or number of secondary storage component or components, use no secondary stored component by transferring code directly to a subsequent messaging or other application, etc.

In the preferred embodiments, the secondary queue or queues used may be created upon installation or startup, as desired. Sendmail 2a has also been modified to point to Queue 2a for outgoing messages rather than the original Queue 1. This modification in this embodiment was accomplished by way of a command line, although other methods of modification are possible such as to a sendmail configuration file, etc.

In this embodiment, sendmail forks a child process Sendmail 1a when it detects an incoming message. Sendmail 1a parses the message into header and body, and those header and body components are stored in Queue 1a. Copies of the header and body components are then made by Transfer Component 1a and passed to Decomposer Component 21 and Categorization Component 31. These components evaluate the message for proscribed code in a similar manner to that described below with regard to Decomposer Component 20 and Categorization Component 30. The message is reassembled and passed to Comparison Component 41, which provides a threshold for the proscribed code evaluation, in a manner similar to that further described above with regard to Comparison Component 40.

In some embodiments, code information, e.g. location information, directory information, etc., rather than or in addition to code or copies of code might be transferred. The transfer of this information allows for subsequent operations in these embodiments, e.g., proscribed code scanning, etc. Therefore the word "transfer" as used herein with regard to code or messages is intended to encompass transfer of code, copies of code and code information.

After Comparison Component 41, which in the especially preferred embodiments is VFIND®, a pattern detector from CyberSoft, Inc.) scans the message for proscribed code, it returns an indicator of the result of the scan to Transfer Component 1a. This proscribed code indicator may take many forms: e.g. whether the content is acceptable, that is, has no proscribed code; whether the message is virus infected; whether the message is merely spam, etc. Transfer Component 1a moves the header and body components to the appropriate queues, (Queue 2a, Queue 3a, Queue 4a or Queue 5a) based on the indication from Comparison Component 41 as described above.

In especially preferred embodiments, Comparison Component 41 and Transfer Component 1a are able to communicate in order to assist the process. For example, a transfer component might well use the same or similar flags or other indicators of comparison component. This type of information exchange would be also helpful in a number of other ways, for example, to interrogate a comparison component in order to understand the scanner's messaging processing status, etc.

Returning now to the embodiment of FIG. 3, each secondary queue contains a different category of messages or attachments after processing by Comparison Component 41. Secondary queue directory Queue 2a contains messages that have passed the scanning and may now be processed by Sendmail 2a accordingly; secondary queue directory Queue 3a contains messages that are infected by a virus; secondary queue directory Queue 4a contains messages that qualify as junk mail or spam; and, secondary director, Queue 5a contains messages that contain confidential material that is not to be sent by email.

In other embodiments there may be more or fewer secondary queue directories, as desired, containing any sort of code categories. For example, one embodiment may sort mail, or other stored and forwarded code, into categories, for example by size. The number of secondary queue directories in this type of embodiment could then depend upon message sizes, with different sizes being placed into different secondary queues. Such an arrangement would assist in preventing message lag, wherein large messages would take more time to pass through the system and so block smaller messages. By placing larger messages into a secondary queue or queues separate from the secondary queues of smaller messages, the smaller messages could proceed through the system more quickly.

In some preferred embodiments, the message header and/or envelope provides information to be used for decisions by a transfer component. For example, an embodiment may implement a number of proscribed code scanners, each with different settings for scanning different code. Messages may be sent to a particular scanner by a transfer component according to header information, i.e., a previously untrustworthy header might sent to a virus proscribed code scanner, etc. Of course a header indicating spam might be sent directly to a queue in certain embodiments, without going through a proscribed code scanner first.

Of course, as discussed above, other embodiments may use other arrangements and other numbers of secondary queues as desired. As an example, if a store and forward process uses more than one original queue, more than one secondary queue may be created Returning now to the embodiment of FIG. 3, once the messages are stored in the secondary queues, those in Queue 2a will be processed by Sendmail 2a for subsequent delivery. The messages stored in the other secondary queues may be disposed of, modified, stripped of offending material, etc. or otherwise treated in any manner as desired. For example, the infected messages and/or attachments may be brought to the user, administrators, or another's attention.

As should be clear, any type of stored and forwarded code may be intercepted, examined, and/or controlled. In some embodiments, for example, the proscribed code scanner may be reviewing the code for sexually or racially harassing material, for corporate trade secrets, or for any other predetermined code. Additionally, in various embodiments, the transfer component may classify code according to various parameters as mentioned above.

One or more embodiments may be placed in communication with another embodiment as well. For example, prior to the start of code transmission a secure channel could be created such as a VPN or the like. Additionally, other security methods could be used, such as secret key and/or public key management systems.

As was described above, distributed computing embodiments may be used. Additionally, any parts, features, components, functions, etc. may be shared among one or more systems. For example, systems may cooperatively execute parts of an embodiment. An example would be more than one system sharing various features and/or functions in a round robin manner, i.e., System A providing code decomposing, System B providing valuation, etc. for a fixed or variable period of time. Another example is shared storage, so that one or more storage components, e.g. queues, could be shared among systems, thus providing all systems with a similar data pool.

In alternate embodiments, the invention comprises an article of manufacture, or signal-bearing medium, containing computer readable code. Examples of such articles include tarred code and other types and/or methods of storing, archiving and/or compressing code known in the art, contained on any media known in the art, such as CD-ROM's, floppy disks, etc.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

We claim:

1. A method for processing stored and forwarded code comprising: transferring code to be analyzed to a storage component; preprocessing said code; decomposing said code, valuing said code and thereby obtaining a code value, transferring said code, via a transfer component to a comparison component; comparing said code value to a threshold value; indicating, via said comparison component to said transfer component, whether said code contains proscribed code; and, transferring said code to at least one secondary storage component based on said indication, obtaining processing statistics for use in connection with the analysis of said code, and directing the code to an output path according to code parameters, wherein the method includes constructing a proscribed code database and constructing a non-proscribed code database, wherein said proscribed code database and said non-proscribed code database are initially populated manually by user identification and assignment of proscribed code, and wherein subsequent to said manual population of said databases, said databases are further populated automatically using data generated from a pattern scanner, and wherein said automatic population of said databases includes adaptively training said databases.

2. A method as in claim 1 further comprising transferring said code from said at least one secondary storage component to a subsequent code transfer component.

3. A method as in claim 1 further comprising sorting said code prior to transfer to said at least one secondary storage component.

4. A method as in claim 3 further comprising transferring code to at least two secondary storage components, with a first of at least two secondary storage components receiving stored and forwarded code groups and a second of at least two secondary storage components receiving stored and forwarded code groups, wherein said stored and forwarded code groups received by said first secondary storage component contain a lower number of tokens relative to the number of tokens contained in the said stored and forwarded code groups of said second secondary storage component.

5. A method as in claim 1 wherein said code comprises email.

6. A method as in claim 1 wherein said comparison component comprises a proscribed code scanner.

7. A method for processing stored and forwarded code comprising: preprocessing said code; transferring code, from a storage component, to a first transfer component; decomposing said code, valuing said code and thereby obtaining a code value, the code value comprising processing statistics, transferring said code, from said first transfer component to a comparison component; comparing said code value to a threshold value; indicating, via said comparison component to said first transfer component, whether said code contains proscribed code; sorting said code; transferring said code, based on the results of said sort, to at least one first secondary storage component; transferring said code from at least one first secondary storage component to at least one additional secondary storage component based on said indication, wherein said sort comprises assigning code to a group level and wherein valuing said code includes valuing said code and said group level, wherein said code and said group level to which it is assigned are arranged in a string, the method including processing said string for determination of code transfer to at least one storage component.

8. A method as in claim 7 further comprising transferring said code from said at least one secondary storage component to a subsequent code transfer component.

9. A method as in claim 7 wherein the step of sorting said code further comprises sorting the code by size.

10. A method as in claim 7 wherein said code comprises email.

11. A method as in claim 10 further comprising the step of transferring said email from said at least one secondary sendmail queue to a subsequent sendmail process.

12. A method as in claim 11 wherein the step of sorting said email prior to transfer to said at least one secondary sendmail queue component further comprises sorting the email by size.

13. A method as in claim 10 further comprising the step of sorting said email prior to transfer to said at least one secondary sendmail queue.

14. A method as in claim 7 wherein said comparison component comprises a proscribed code scanner.

15. An apparatus for processing stored and forwarded code comprising:
    a storage component, for storing code to be analyzed;
    a preprocessing component for processing code to provide a first analysis of said code;
    a code decomposing component for decomposing code;
    a valuation component for valuing the decomposed code, a comparison component for comparing code values to a threshold value;
    a secondary storage component for receiving code processed by said comparison component;
    whereby said code to be analyzed is received from said storage component by said preprocessing component and preprocessed in order to provide for a first analysis of said code, decomposed by said decomposing component to yield the greatest number of discrete code characters, valued to a code value by said valuation component, and
    whereby said code value is processed by said comparison component by comparing said code value to a threshold value, following which comparison said code is transferred to said second secondary storage component.

16. An apparatus as in claim 15, wherein said secondary storage component contains proscribed code.

17. An apparatus as in claim 15 further comprising a first and a second secondary storage component, whereby said code is transferred to either said first or said second secondary storage component as a result of said comparison.

18. An apparatus as in claim 17 wherein said first secondary storage component comprises a sendmail queue.

19. An apparatus as in claim 15 wherein said storage component comprises a sendmail queue.

20. An apparatus for analyzing code comprising a computer storage media that implements code analysis; a storage component for storing code to be analyzed; a preprocessing component for processing code to provide a first analysis of said code; a code decomposing component for decomposing code; a valuation component for valuing the decomposed code, a comparison component for comparing code values to a threshold value; a secondary storage component for receiving code processed by said comparison component; whereby said code to be analyzed is received from said storage component by said preprocessing component and preprocessed in order to provide for a first analysis of said code, decomposed by said decomposing component to its lowest possible state, valued to a code value by said valuation component, and whereby said code value is processed by said comparison component by comparing said code value to a threshold value, following which comparison said code is transferred to said second secondary storage component.

* * * * *